(12) United States Patent
Mueller

(10) Patent No.: US 8,926,403 B2
(45) Date of Patent: Jan. 6, 2015

(54) METHOD FOR DRESSING OF A MULTIPLE THREAD GRINDING WORM AND FOR GRINDING AND GRINDING WORM

(71) Applicants: KAPP GmbH, Coburg (DE); NILES Werkzeugmaschinen GmbH, Berlin (DE)

(72) Inventor: Frank Mueller, Meeder (DE)

(73) Assignees: KAPP GmbH, Coburg (DE); NILES Werkzeugmaschinen GmbH, Berlin (DE)

( * ) Notice: Subject to any disclaimer, the term of this patent is extended or adjusted under 35 U.S.C. 154(b) by 190 days.

(21) Appl. No.: 13/647,767

(22) Filed: Oct. 9, 2012

(65) Prior Publication Data

US 2013/0090043 A1    Apr. 11, 2013

(30) Foreign Application Priority Data

Oct. 11, 2011 (DE) .......................... 10 2011 115 526

(51) Int. Cl.
*B24B 53/017* (2012.01)
*B23F 23/12* (2006.01)

(52) U.S. Cl.
CPC .................................. *B23F 23/1225* (2013.01)
USPC .............................. 451/47; 451/56; 451/443

(58) Field of Classification Search
CPC ........ B24B 3/017; B24B 53/12; B24B 37/04; B24B 57/02; B24B 37/042
USPC ................................................ 451/56, 47, 443
See application file for complete search history.

(56) References Cited

U.S. PATENT DOCUMENTS

| | | | | | |
|---|---|---|---|---|---|
| 4,475,319 | A | * | 10/1984 | Wirz | 451/5 |
| 5,738,569 | A | * | 4/1998 | Mackowsky | 451/56 |
| 6,077,150 | A | * | 6/2000 | Jankowski | 451/47 |
| 6,234,880 | B1 | * | 5/2001 | Scacchi | 451/47 |
| 6,491,568 | B1 | * | 12/2002 | Jankowski | 451/5 |
| 2005/0239385 | A1 | * | 10/2005 | Jankowski et al. | 451/540 |
| 2005/0245176 | A1 | * | 11/2005 | Thyssen | 451/56 |
| 2008/0264401 | A1 | * | 10/2008 | Lopez | 125/11.03 |
| 2008/0268756 | A1 | * | 10/2008 | Schenk | 451/177 |
| 2009/0227182 | A1 | * | 9/2009 | Breith et al. | 451/5 |
| 2009/0233526 | A1 | * | 9/2009 | Demmler et al. | 451/5 |

FOREIGN PATENT DOCUMENTS

| | | |
|---|---|---|
| DE | 695 26 851 | 12/2002 |
| DE | 10 2007 020 479 | 10/2008 |
| DE | 10 2009 021 578 | 11/2010 |

* cited by examiner

*Primary Examiner* — George Nguyen
(74) *Attorney, Agent, or Firm* — Lucas & Mercanti, LLP

(57) ABSTRACT

A dressing tool produces a plurality of first radial sections in a first flank of a first screw channel in a grinding worm, and a plurality of second radial sections in a second flank of a second screw channel in the grinding worm. Each radial section extends only a portion of a total radial height of the respective flank, the portion being less than the total radial height of the respective flank. Each first radial section in the first screw channel is radially displaced with respect to a corresponding second radial section in the second screw channel.

10 Claims, 5 Drawing Sheets

METHOD FOR DRESSING OF A MULTIPLE THREAD GRINDING WORM AND FOR GRINDING AND GRINDING WORM

This Application claims the priority of German Application No. 10 2011 115 526.4, filed Oct. 11, 2011, the entire content of which is hereby incorporated by reference.

TECHNICAL FIELD

The invention relates to a method for dressing of a multiple thread grinding worm, wherein the contour of the flanks of the screw channels which are running spiral-like and parallel to another is produced by a dressing tool. Furthermore, the invention relates to a method for grinding of a workpiece and a grinding worm.

BACKGROUND

At the grinding of gears and similar component parts with a grinding worm, i. e. by using the generative gear grinding method, it is necessary to dress the worm before the grinding, i. e. to profile the contour of the flank of the screw channels. For this purpose a diamante dressing wheel can be used, which, controlled by NC, can be driven along the contour of the flank and thus produces the required profile. The so-called topological dressing method is possible here, as it is described for example in the DE 10 2007 020 479 B4. The contour of the flank of the screw channel is produced here virtual point-wise respectively line-wise, wherein the contour of the flank is built up in a number of radial infeeds between grinding worm and dressing wheel.

Similar solutions are known from DE 695 26 851 T2 and from DE 10 2009 021 578 A1.

Also possible is the full-profile dressing, where a profiled dressing tool dips into the screw channel and in doing so gives up its form to the flanks of the screw channel.

If a multiple thread grinding worm is used, where thus several screw channels take course spiral-shaped parallel to each other, the dressing process for each of the screw channels is carried out successively. After a screw channel is dressed, it is "divided" and the dressing for the next screw channel will repeat, until in doing so all screw channels are dressed. The result is that all screw channels respectively the contours of the flanks of the screw channels are dressed respectively accomplished equally, both in regard to their geometry and their surface structure. It is pursued that the profile of the contour of the flank is the same in all screw channels as much as possible.

If the contour of the flank is built up point-wise respectively line-wise with the topological dressing method, the dressing tool has to exhibit an adequate overlap within the individual "lines" to true up the profile upon the flank with high accuracy. For this purpose only small radial increments from line to line are chosen, which indeed ensures an exact contour, but which is relatively time-consuming. Accordingly, the dressing times with the topological dressing method are thus correspondingly long due to the high overlap factor, if an adequate grinding quality has to be pursued respectively reached. The number of the dressing strokes per thread has to be chosen adequately high, which is time-consuming.

SUMMARY

Thus it is an object of the invention to develop a method of the generic kind for dressing of a grinding worm in such a way, that an equally good grinding result can be reached in a less time-consuming manner, respectively that a better dressing result is achievable with the same amount of dressing time. For this purpose a suitable grinding method and a suitable grinding worm shall also be suggested.

The solution of this object by the invention for a method for dressing of a multiple thread grinding worm is characterized in that in at least two screw channels contours of the flanks are produced which are distinguished from another by their geometry and/or by their surface structure, wherein the dressing is carried out with a dressing tool which cutting region extends only along a part of the total radial height of the contour of the flank—i. e. by using of the topological dressing method—, wherein the whole contour of the flank is produced in several dressing steps, by which different radial sections of the contour of the flank are produced, wherein the individual radial sections are arranged radially displaced to each other in at least two screw channels.

Thus, in distinction to the state of the art it is suggested that the geometries of the contours of the flanks of the individual screw channels distinguish from each other selectively, respectively that differences regarding to the surface structure exist.

Preferably, in all screw channels contours of the flanks are produced, which are distinguished from another by their geometry and/or by their surface structure.

A part of a dressing process occurs preferably in such a way that a relative axial movement between the grinding worm and dressing tool is driven at a constant radial distance between the grinding worm and dressing tool.

The radial offset between the individual radial sections within the screw channels is preferably allocated equally distanced.

The dressing occurs preferably by using a disc-shaped dressing tool, which rotates around an axis of rotation during the dressing process.

In this case it can be provided according to a special embodiment of the proposed method that the dressing of the individual screw channels occurs by choosing different distances between the axes of the grinding worm and the disc-shaped dressing tool, wherein then during dressing of the individual screw channels different pivoting angles are used between the axis of rotation of the grinding worm and the axis of rotation of the dressing tool. In doing so the mentioned axes are aligned warped to each other (i. e. the axes are not parallel and also don't cut themselves). The relative pivoting angle is varied from screw channel to screw channel, indeed at a changed radial distance between the grinding worm and the dressing wheel. Herewith the surface structure of the flanks of the screw channels can be specifically affected, because there are other meshing situations on hand during dressing from screw channel to screw channel.

An embodiment suggests that at least two axial sections adjoining to another are profiled along the axial extension of the grinding worm, wherein the contours of the flanks in the axial adjoining sections in a screw channel are distinguished from another by their geometry and/or by their surface structure.

The suggested method for grinding of a work piece which has a number of teeth or teeth-like protrusions along its circumference with a grinding worm with a number of screw channels, in which the above described dressing method is used is characterized in that the ratio between the number of teeth or teeth-like protrusions and the number of screw channels is chosen to be not in whole numbers.

By doing so the effect is achieved that at the application of the multi-threaded grinding worm for the grinding operation of a gear or a similar workpiece every channel of the grinding worm comes into contact several times with every tooth space. The number of screw channels of the grinding worm is chosen at the given workpiece. Thus, the number of teeth of the workpiece divided through the number of screw channels must not be integer.

The suggested multiple thread grinding worm for grinding of a gear or a rotor with a teeth-like profile it characterized in that at least two screw channels have contours of the flanks which are distinguished from another by their geometry and/or by their surface structure, wherein the whole contour of the flank consist of several radial sections and wherein the individual radial sections are arranged radially displaced to each other in at least two screw channels.

The grinding worm is preferably characterized in that at least two axial sections adjoining to another are arranged along the axial extension of the grinding worm, wherein the contours of the flanks in the axial adjoining sections in a screw channel are distinguished from another by their geometry and/or by their surface structure.

The suggested method respectively the suggested grinding worm can be employed for the hard finishing of gears and special profiles (like for example rotors or cycloids).

The method can be employed both at topological dressing and at full profile dressing.

Thus, the invention goes the contrary way by comparison with the state of the art: The individual screw channels of the grinding worm are dressed selectively different to obtain different surface structures respectively geometries.

Thus, the invention suggests that the grinding worm is dressed in such a manner at least in sections, i. e. along a defined axial section, so to speak at a defined axial position, that in said section respectively at said axial position in different screw channels a different profile geometry respectively surface structure is given.

The profile geometry respectively surface structure can change along the axial extension of the grinding worm in a screw channel. Then, different profiled axial sections of the grinding worm can be allocated during grinding to different axial sections of the workpiece, to create specific profile modifications at the workpiece. With respect to this method reference is made to DE 695 26 851 T2 where this method is described in detail.

If at the grinding of a workpiece every screw channel of the tool meshes then several times with every workpiece space, the form of the individual screw channels are transmitted completely upon the workpiece. Hereby the surface structure and the geometry of the workpiece can be affected.

Therefore the dressing of a grinding worm can occur in a shorter time and/or the quality of the machining of the workpiece can be raised.

With the suggested method various objective targets can be achieved:

At first an increase of the overlap factor can be reached at the topological dressing.

At the topological dressing virtually a point contact exists—as mentioned above—between the dressing tool and the screw channel flank of the grinding worm which is to be dressed. The desired profile is applied through the dressing by individual "tracks" respectively "lines" upon the tool. The distance of the mentioned "tracks" respectively "lines" is essential for the grinding result. If the distance of the individual tracks is in accordance with the effective width (respectively effective height) of the dressing tool, the overlap factor is 1. Theoretically this corresponds with the smallest possible overlap and thus with a dressing of the smallest possible number of individual tracks. Because of quality reasons a considerably higher overlap factor is chosen in practice, which demands a corresponding longer dressing time.

As mentioned above a very beneficial embodiment of the invention concept exists in this connection in applying the mentioned tracks radial displaced or offset upon the different screw channels of the grinding worm and thus in reaching a theoretically higher overlap factor.

A farther benefit of the suggested method is the possibility of influencing of the structure.

Every individual screw channel is dressed in this connection for example with distances between the axes of the dressing tool and the grinding worm which are a bit different. The geometry of the individual channels which changes thereby is corrected at the dressing by a correction of the pivoting angle of the axes of the dressing wheel and the grinding worm so that all contours of the flanks are indeed the same from the geometry, but are distinguished from another in their surface structure.

The objective hereby is to obtain a broken surface structure at the grinding, which affects positively upon the noise behavior of the workpiece at the later operation, for example within a gearbox.

Furthermore an impact of the geometry can be pursued.

If the individual screw channels are dressed differently in their geometry, it is possible to affect hereby the geometry of the workpiece at the grinding, whereto a shift movement occurs during grinding (movement in the direction of the axis of rotation of the grinding worm).

In the drawing an embodiment of the invention is shown.

DETAILED DESCRIPTION

Figure 1:
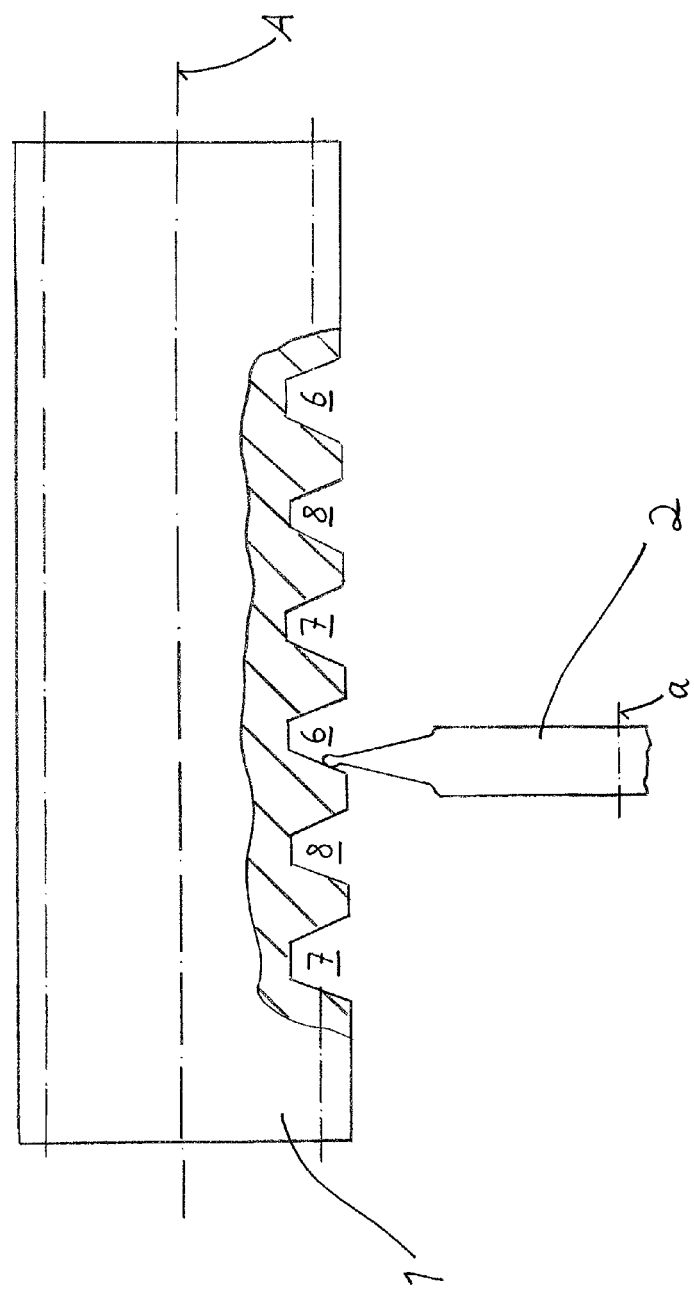
FIG. 1 shows schematically a three-thread grinding worm in the side view, which is dressed by a dressing tool.

FIG. 1 shows at first generally how a grinding worm 1 is dressed using a dressing tool 2. The dressing tool is constructed here as a dressing wheel that rotates around an axis a during dressing. The grinding worm 1 rotates during dressing around its own axis of rotation A.

The grinding worm 1 is constructed here with three thread, i. e. three screw channels 6, 7 and 8 run helical and parallel next to each other around the axis of rotation A.

Figure 2:
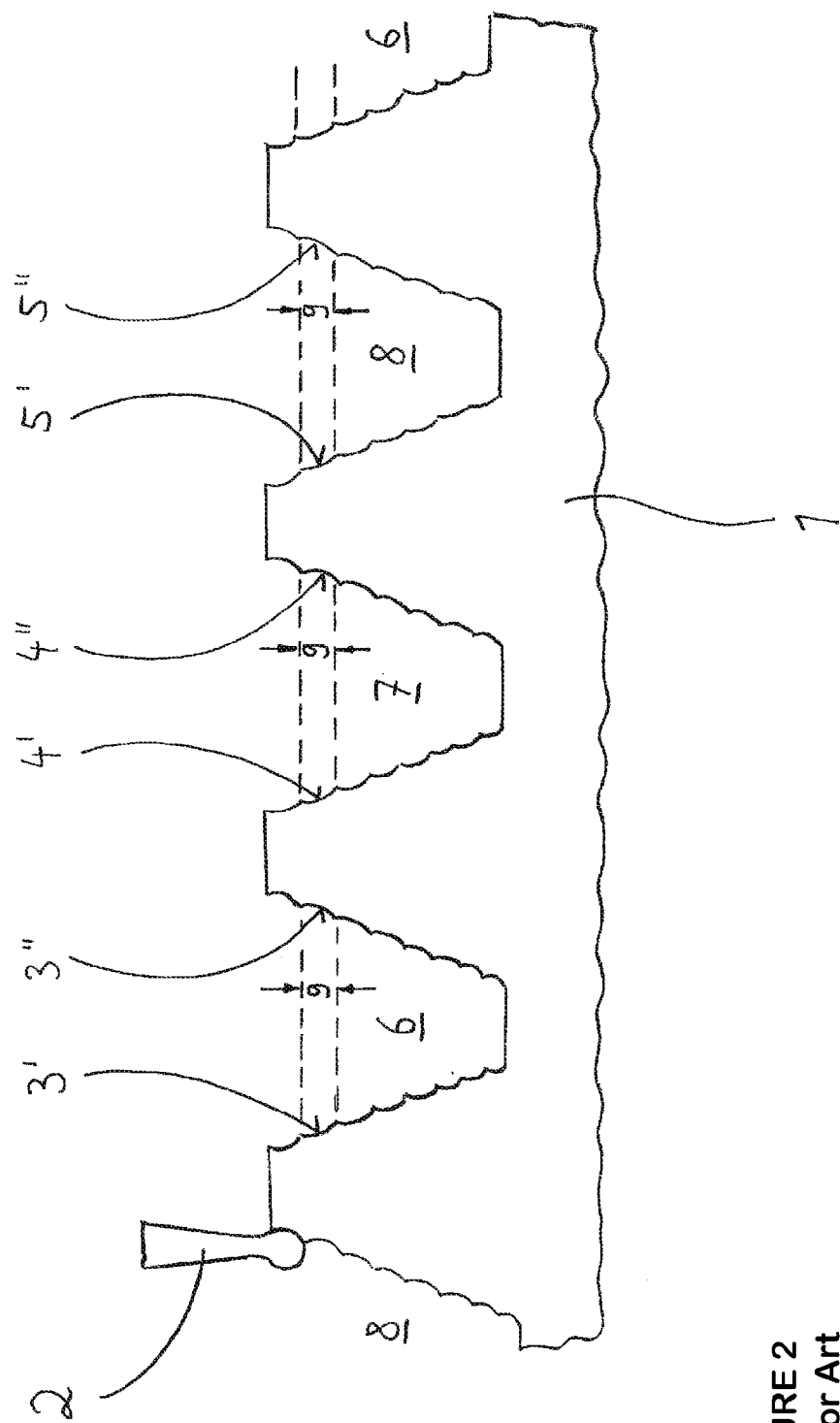
FIG. 2 shows a partial radial section of the grinding worm according FIG. 1, wherein the kind of dressing is shown according to the state of the art.

The process of dressing is shown in FIG. 2, as it is common in the state of the art. It can be seen that the dressing tool 2 with its cutting surface is led line-wise respectively row-wise upon a defined radius into axial direction, to produce successively the contours of the flanks 3' and 3" of the screw channel 6, the contours of the flanks 4' and 4" of the screw channel 7 and the contours of the flanks 5' and 5" of the screw channel 8 (topological dressing). In doing so the dressing tool 2 cuts a radial section 9 into the flank of every line respectively row. After a row is dressed, the dressing tool 2 will be fed radially relatively to the grinding worm 1 by an amount which is in accordance for example to the radial height of the radial section 9.

Accordingly, a grinding worm is characterized according to the state of the art, that all dressing-lines in all screw channels 6, 7, 8 lie on the same radius, which is indicated with the horizontal dashed lines in FIG. 2.

Figure 3:
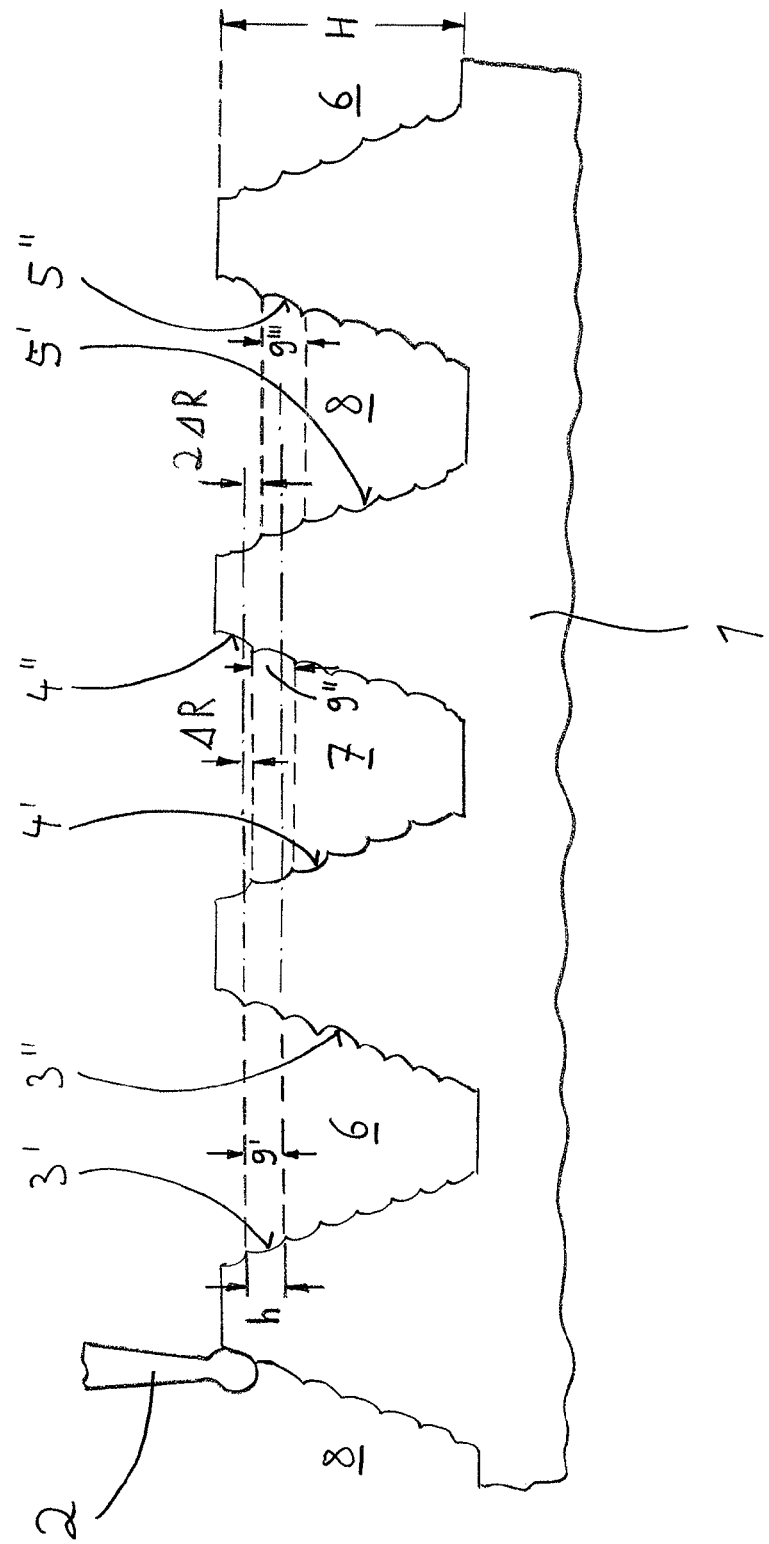
FIG. 3 shows a partial radial section of the grinding worm according FIG. 1, wherein a dressing according to the invention is shown.
Figure 4:
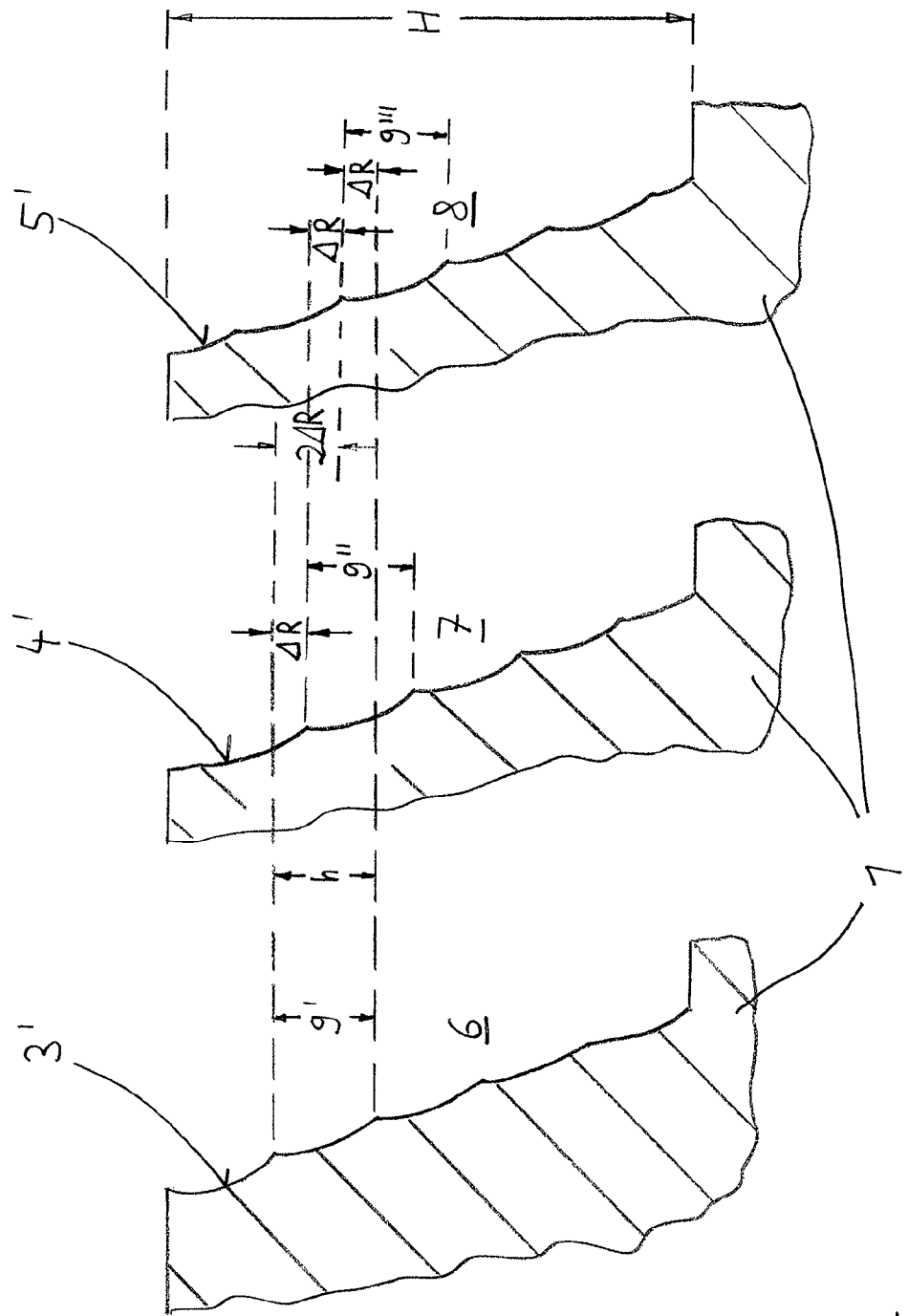
FIG. 4 shows three neighboring flanks of the grinding worm in magnified depiction according to FIG. 3.

In contrast, FIG. 3 shows another procedural method and FIG. 4 in a magnified depiction (for the three contours of flanks 3', 4' and 5' from FIG. 3) as it results here at the application of the present invention for a concrete embodiment.

Again it is dressed row-wise respectively line-wise (topological dressing). This occurs for the first screw channel 5 as in case of FIG. 2 for the screw channel 5. The dressing tool 2 leaves its profile upon the contour of the flank 3' for a radial section 9'. This radial section 9' is basically in accordance to the radial height h of the cutting region of the dressing tool 2. Accordingly it is obvious immediately that a number of dressing strokes (rows) is necessary to cover the whole radial height H of the contour of flanks 3, 4, 5 with the radial height h of the cutting region of the dressing tool 2.

However, the subsequent screw channel 7 respectively the contour of the flank 4' is not dressed with the same radial distance between the dressing tool 2 and the grinding worm 1, but the radial distance is reduced by a radial offset ΔR. Consequently, the contour of the flank 4' is changed geometrically compared with the contour of the flank 3'.

Accordingly, the same way will be approached at the dressing of the contour of the flank 5'. Again the radial distance was reduced here by the radial offset ΔR between the dressing tool 2 and the grinding worm 1, which is why the corresponding 'Mines' is radially displaced relatively to the first screw channel 6 by 2 ΔR.

Accordingly, the radial sections 9', 9" and 9'" of the three subsequent screw channels 6, 7 and 8 are displaced to each other each by the radial offset ΔR.

As can be seen in FIG. 4, the radial offsets ΔR are equally chosen from screw channel to screw channel (equidistantly). The radial offset ΔR. is at hand one third of the radial sections 9', 9" respectively 9'" or of the radial height h of the cutting region of the dressing tool 2.

If the number of the screw channels is chosen in that way, that the quotient from the number of the teeth of the gear ($Z_W$) and the number of the screw channels ($z_S$) of the grinding worm is not in whole numbers, all the teeth of the gear get slowly into all screw channels, why an equalization of the grinding surface is achieved.

This results from the fact that the "apexes" on the flanks are reduced in their impact during grinding of the gear, which are depicted strongly immoderate in FIG. 4.

Figure 5:
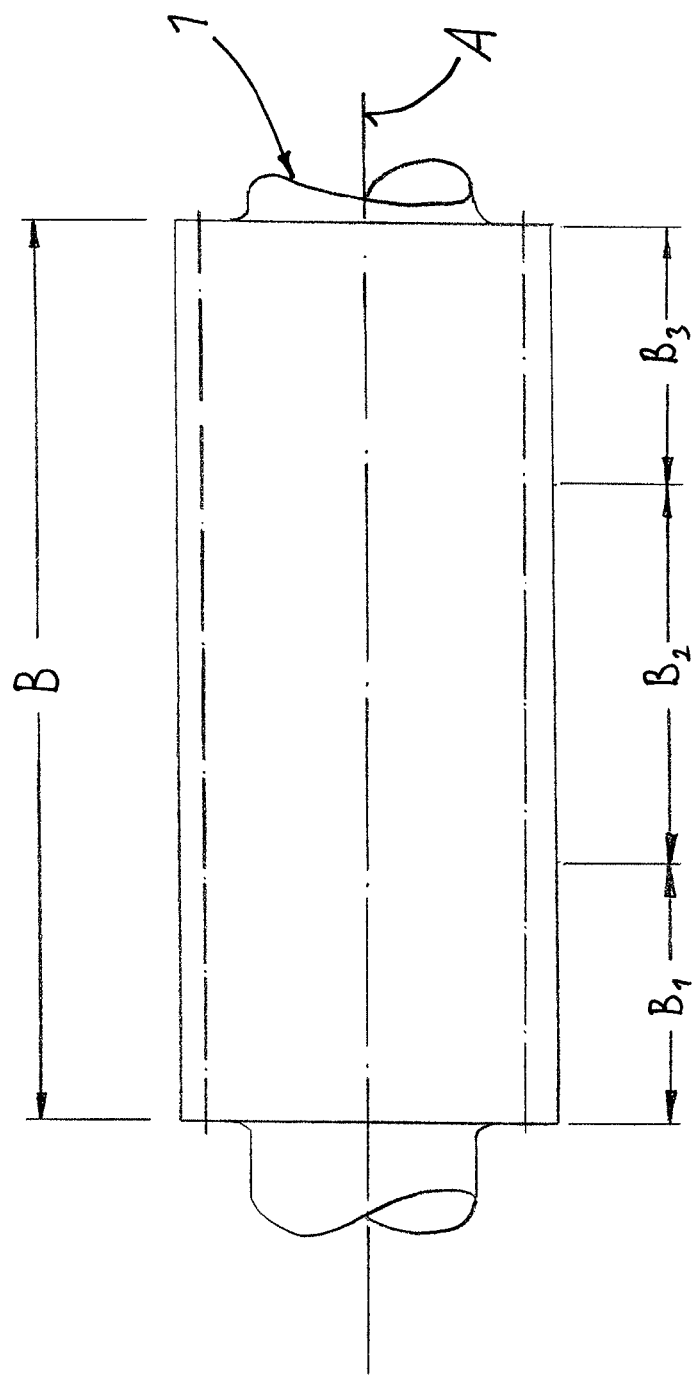
FIG. 5 shows schematically the side view of a grinding worm, wherein several axial sections of the grinding worm are marked.

In FIG. 5 it is schematically shown that the grinding worm 1 comprises an axial extension B, which is divided into three axial sections, namely in an first axial section $B_1$, a second axial section $B_2$ and a third axial section $B_3$. In the three axial sections $B_1$, $B_2$ and $B_3$ the profile is not only provided—as explained—with a radial offset ΔR from screw channel to screw channel, but the profile of the contour of the flank is also different within a screw channel along the axial extension of the grinding worm 1. By doing so it becomes possible to create profile modification at the gear to be ground, by allocating different axial sections $B_1$, $B_2$, $B_3$ to different width sections of the workpiece during grinding of a gear.

The following reference numbers are used in the Drawings:
1 Grinding worm
2 Dressing Tool
3', 3", Contour of the flank
4', 4" Contour of the flank
5', 5", Contour of the flank
6 Screw channel
7 Screw channel
8 Screw channel
9 Radial section
9' Radial section
9" Radial section
9'"Radial section
h Radial height of the cutting region
H Radial height of the contour of the flank
ΔR Radial offset
a Axis of rotation of the dressing tool
A Axis of rotation of the grinding worm
$z_W$ Number of teeth or teeth-like protrusions
$z_S$ Number of screw channels
B Axial extension of the grinding worm
$B_1$ First axial section of the grinding worm
$B_2$ Second axial section of the grinding worm
$B_3$ Third axial section of the grinding worm

The invention claimed is:

1. A method for dressing of a multiple thread grinding worm having at least two screw channels which run spiral and parallel to each other on the grinding worm, the method comprising:
producing, by a dressing tool, a plurality of first radial sections in a first flank of a first screw channel in the grinding worm;
producing, by the dressing tool, a plurality of second radial sections in a second flank of a second screw channel in the grinding worm;
wherein each of the first and second radial sections extends only a portion of a total radial height of the respective first and second flank, the portion being less than the total radial height of the respective first and second flank;
wherein each of the first radial sections in the first screw channel is radially offset relative to a corresponding one of each of the second radial sections in the second screw channel.

2. The method according to claim 1, wherein the grinding worm has three screw channels which run spiral and parallel to each other on the worm gear; and the method further comprises:
producing, by the dressing tool, a plurality of third radial sections in a third flank of a third screw channel.

3. The method according to claim 1, wherein a relative axial movement between the grinding worm and the dressing tool is driven at a constant radial distance between the grinding worm and the dressing tool.

4. The method according to claim 1, wherein each of the first radial sections within the first screw channel are radially offset relative to the corresponding one of each of the second radial sections within the second screw channel by the same predetermined distance.

5. The method according to claim 1, wherein the dressing tool is disc-shaped and rotates around an axis of rotation during a dressing process.

6. The method according to claim 5, wherein the each of the first radial sections within the first screw channel is produced by selecting a first distance between an axis of the grinding worm and the axis of the dressing tool, and the corresponding one of each of the second radial sections within the second screw channel is produced by selecting a second distance between the axis of the grinding worm and the axis of the dressing tool, wherein a difference between the first distance and the second distance is equal to a predetermined offset.

7. The method according to claim 6, wherein the grinding worm comprises adjacent first and second axial sections along an axial extension of the grinding worm, wherein one of a geometry feature and a surface structure feature of the radial sections of a flank of a screw channel in the first axial section is different from a corresponding feature in corresponding radial sections in a flank in a corresponding screw channel of the second axial section.

8. A method for grinding a work piece having a first number of teeth along a circumference with a grinding worm with a second number of screw channels, wherein the grinding worm is dressed according to the method of claim 1, wherein a ratio between the first number of teeth and the second number of screw channels is not a whole number.

9. A grinding worm for grinding a gear or a rotor, the grinding worm comprising:
   a first screw channel; and
   a second screw channel;
   wherein the first screw channel and the second screw channel run spiral and parallel to each other on the grinding worm
   wherein the first screw channel comprises a first flank, the first flank comprising a plurality of first radial sections, and the second screw channel comprises a second flank, the second flank comprising a plurality of second radial sections, wherein each of the first and second radial sections extends only a portion of a total radial height of the respective first and second flank, the portion being less than the total radial height of the respective first and second flank;
   wherein each of the first radial sections in the first screw channel is radially offset relative to a corresponding one of each of the second radial sections in the second screw channels.

10. The grinding worm according to claim 9, comprising adjacent first and second axial sections along an axial extension of the grinding worm, wherein one of a geometry feature and a surface structure feature of the radial sections of a flank of a screw channel in the first axial section is different from a corresponding feature in corresponding radial sections of a flank in a corresponding screw channel of the second axial section.

* * * * *